Patented Jan. 30, 1951

2,539,848

UNITED STATES PATENT OFFICE 2,539,848

PROCAINE UREA

Ralph N. Lulek, Rosebank, N. Y., assignor to Heyden Chemical Corporation, New York, N. Y., a corporation of Delaware No Drawing. Application December 8, 1948,
Serial No. 64,241

4 Claims. (Cl. 260—472)

My invention relates particularly to procaine, or novocaine, derivatives and the process of producing the same.

An object of my invention is to produce such derivatives, also more particularly to obtain modified forms of the well known drug novocaine, such as the hitherto unknown procaine urea $(C_{13}H_{19}O_2N_2)_2CO$, which is useful also in making procaine urea salicylate, a modified form of said drug novocaine providing a source of salicylic acid used in treating ulcers, Therapeutics, Materia Medica and Pharmacy, Potter, 13th ed., 1917, page 862, L. Blakiston's Sons & Co., Phila., Pa. The object is, also, to provide new chemical compounds and to advance the art accordingly.

While my invention may have many different embodiments and may be carried out in many different ways, for the purpose of illustration I have described hereinafter only certain examples thereof.

For example, in making procaine urea $$(C_{13}H_{19}O_2N_2)_2CO$$

which may be expressed as

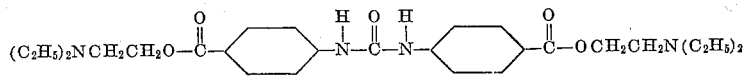

which is di-(β-diethylamino) ethyl ester of 4,4'-dicarboxy diphenyl urea or 4,4'-di-(β-diethylamino) carbethoxy diphenyl urea, I may proceed as follows:

Into a mixture of 1 liter of a tertiary base, such as pyridine, 1 liter of ethyl acetate, and 512 grams of procaine hydrochloride, that is to say novocaine hydrochloride

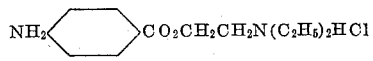

which is very soluble in water and used as a substitute for cocaine and as a local anaesthetic, Martin, Organic Chemistry, 3rd ed., 1917, page 604, Appleton & Company, New York, Thorpe, App. Chem., v. III, page 718, 1916, is passed 100 grams of phosgene. The temperature of the mixture is preferably held between 35° and 40° C. during the addition. Then the mixture is chilled to 15° C. and filtered, and the solid product obtained is recrystallized three times from 90% strength ethanol, and once from 98% strength methanol, to yield 50% of the theoretical amount of procaine urea. The product obtained melts at about 135–136° C.

It will be understood, however, that the proportions of pyridine and ethyl acetate can vary through any desired wide limits. Instead of ethyl acetate I may substitute any other suitable solvents, as for instance acetone, isopropylacetate, etc. Also, the temperature may be varied between 15° and 75° C., as desired, for the reaction. Instead of pyridine I may substitute, for example, quinoline or dimethyl aniline.

In making procaine urea salicylate, which may be expressed as $(C_{13}H_{19}O_2N_2)_2CO(C_7H_6O_3)_2$, I may proceed as follows, for example:

A solution of 13.8 grams of salicylic acid in 50 grams of ethanol, having a strength of 95%, is added to an ethanol solution of 25 grams of said procaine urea containing 30 grams of ethanol of 95% strength. When the alcohol has been removed by distillation the oil remaining solidifies on standing. This solid is recrystallized from ether-methanol comprising 200 cc. of ether and 200 cc. of methanol and then air dried. The yield of procaine urea salicylate is 91.5%, based on the procaine urea originally present. It melts at about 102–105° C.

The proportions of the ethanol as above can be varied within wide limits, as desired. Also, instead of ethanol I may substitute other alcohols, such as isopropanol, n-propanol, etc., and instead of the ether-methanol solution I may substitute substantially any other ether-alcohol mixture as a solvent.

While I have described my invention above in detail it will be understood that the same may be varied without departing from the spirit of my invention.

I claim:

1. A new chemical compound 4,4'-di-(β-diethylamino) carbethoxy diphenyl urea, having the following formula:

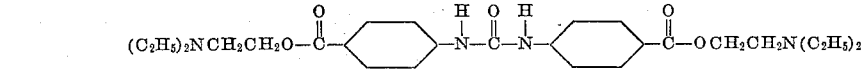

2. The process which comprises reacting at a temperature between 15° and 75° C., procaine hydrochloride with phosgene in the presence of a tertiary base to form procaine urea.

3. The process which comprises reacting, at about 35° to 40° C., procaine hydrochloride with phosgene in the presence of a tertiary base to form procaine urea.

4. The process which comprises reacting, at about 35° to 40° C., procaine hydrochloride with phosgene in the presence of a tertiary base to form procaine urea, then chilling and filtering the solid product.

RALPH N. LULEK.

REFERENCES CITED

The following references are of record in the file of this patent:

UNITED STATES PATENTS

| Number | Name | Date |
|---|---|---|
| 1,850,555 | Laska et al. | Mar. 22, 1932 |
| 2,050,557 | Bochmuhl et al. | Aug. 11, 1936 |
| 2,093,265 | Coffey et al. | Sept. 14, 1937 |
| 2,352,691 | Curtis | July 4, 1944 |